United States Patent [19]
Miyagawa et al.

[11] Patent Number: 5,808,641
[45] Date of Patent: Sep. 15, 1998

[54] LIQUID JET HEAD MANUFACTURING METHOD AND A LIQUID JET HEAD MANUFACTURED BY SAID MANUFACTURING METHOD

[75] Inventors: Masashi Miyagawa, Yokohama; Tadayoshi Inamoto, Hachioji; Shin Ishimatsu, Yokohama, all of Japan

[73] Assignee: Canon Kabushiki Kaisha, Tokyo, Japan

[21] Appl. No.: 579,400

[22] Filed: Dec. 27, 1995

[30] Foreign Application Priority Data

Dec. 28, 1994 [JP] Japan .................................. 6-339277

[51] Int. Cl.⁶ .................................................. B41J 2/05
[52] U.S. Cl. .................................................. 347/65; 347/64
[58] Field of Search .................................. 347/65, 63, 64, 347/66, 67

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,509,063 | 4/1985 | Sugitani et al. . |
| 4,521,787 | 6/1985 | Yokota et al. . |
| 4,558,333 | 12/1985 | Sugitani et al. . |
| 4,608,577 | 8/1986 | Hori . |
| 4,609,427 | 9/1986 | Inamoto et al. . |
| 4,636,609 | 1/1987 | Nakamata . |
| 4,666,823 | 5/1987 | Yokota et al. . |
| 4,698,645 | 10/1987 | Inamoto . |
| 4,723,129 | 2/1988 | Endo et al. . |
| 4,740,796 | 4/1988 | Endo et al. . |
| 5,126,768 | 6/1992 | Nozawa et al. . |
| 5,478,606 | 12/1995 | Ohkuma et al. . |
| 5,578,418 | 11/1996 | Noguchi et al. ........................... 347/65 |
| 5,694,684 | 12/1997 | Yamamoto ................................ 347/65 |

FOREIGN PATENT DOCUMENTS

| | | |
|---|---|---|
| 0509491 | 10/1992 | European Pat. Off. . |
| 0531061 | 3/1993 | European Pat. Off. . |
| 0590873 | 4/1994 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |

*Primary Examiner*—Peter S. Wong
*Assistant Examiner*—K. Shin
*Attorney, Agent, or Firm*—Fitzpatrick, Cella, Harper & Scinto

[57] ABSTRACT

A manufacturing method of a liquid jet head comprises the discharge ports for discharging the ink, the liquid channels in communication to the discharge ports, and energy generating means for generating the energy for use in discharging the ink. The method includes the steps of preparing a substrate having the energy generating means, preparing a resin ceiling plate fabricated by molding and having the grooves which constitute part of the liquid channels, positioning and contacting the ceiling plate on and with the substrate so that the grooves may be located above the energy generating means, and forming the liquid channels constituted of the grooves and the substrate by directing a laser beam from outside the ceiling plate in the state where the ceiling plate and the substrate are joined, to weld together the ceiling plate and the substrate.

20 Claims, 13 Drawing Sheets

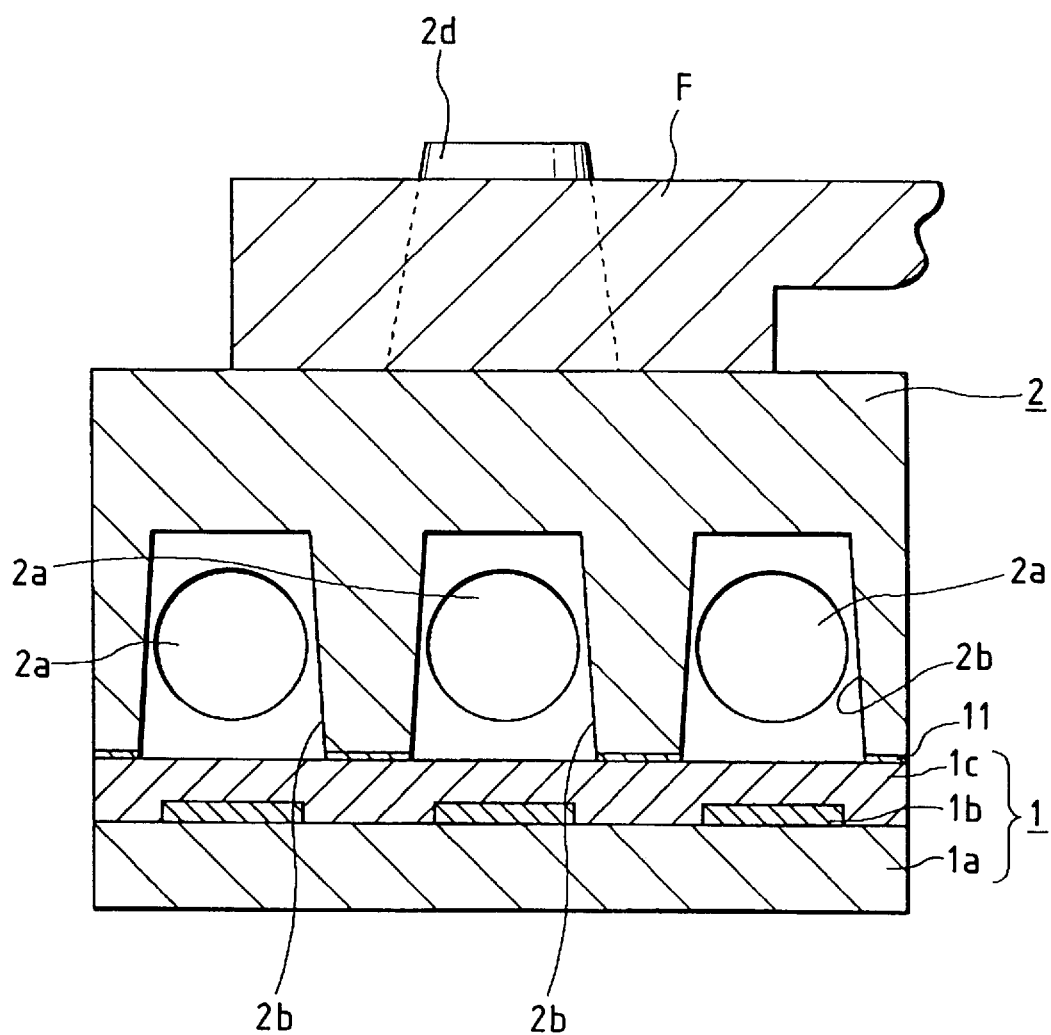

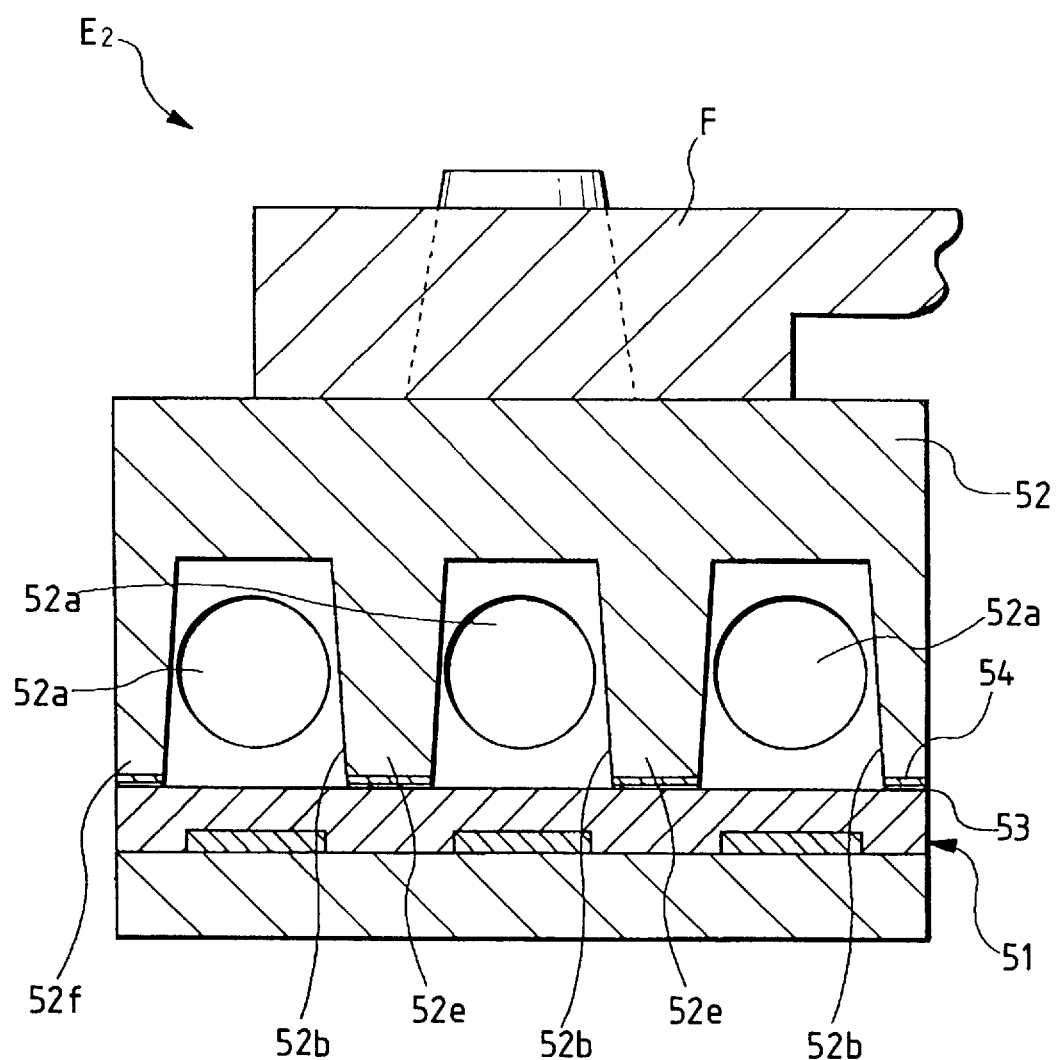

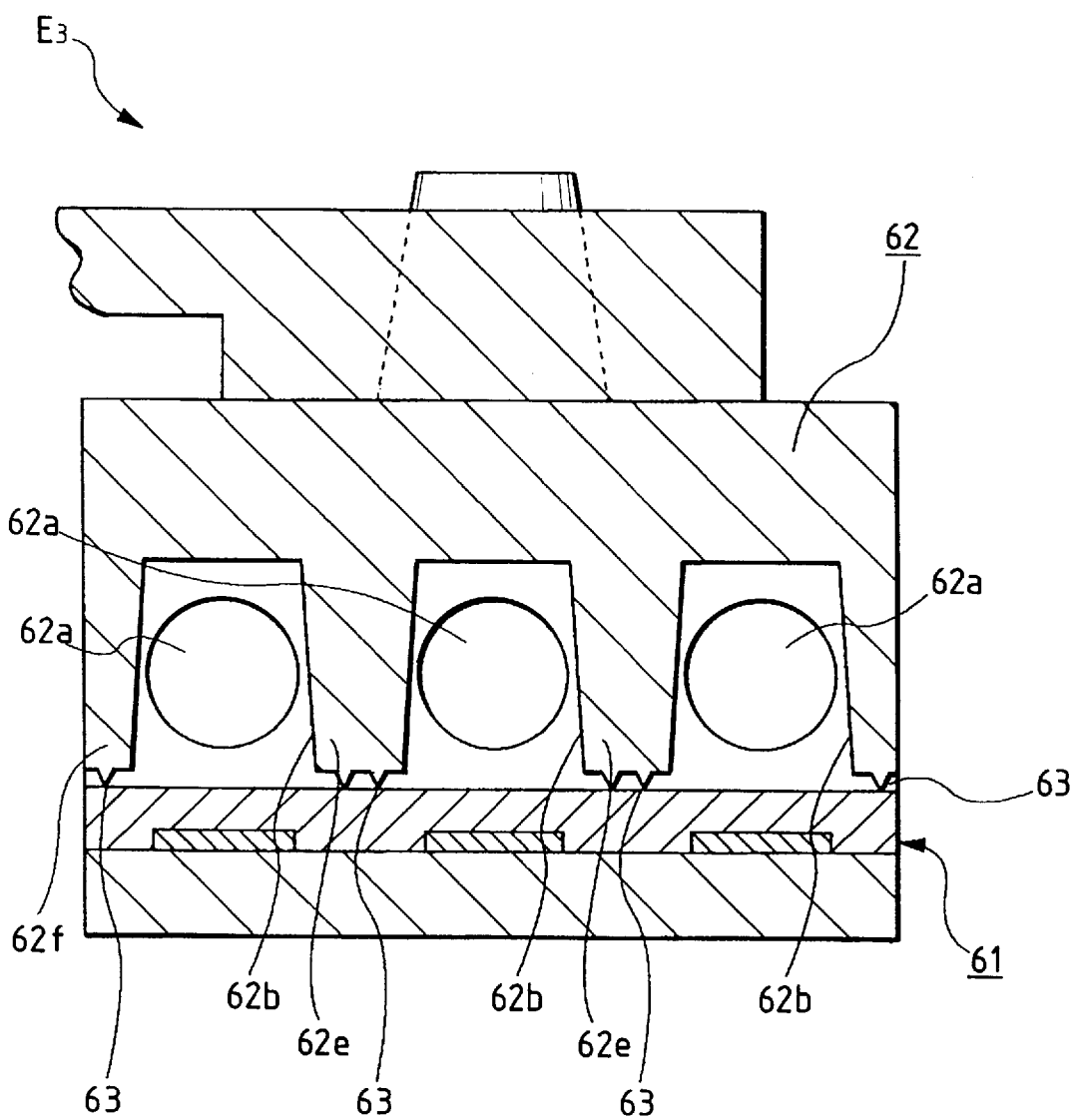

LIQUID JET HEAD MANUFACTURING METHOD AND A LIQUID JET HEAD MANUFACTURED BY SAID MANUFACTURING METHOD

BACKGROUND OF THE INVENTION

1. Field of the Invention

The present invention relates to a liquid jet head for printing on a recording medium (recording sheet) by discharging flying liquid droplets through fine discharge ports (orifices), and a liquid jet head manufactured by said manufacturing method of said liquid jet head.

2. Related Background Art

A liquid jet head for printing on a printing medium (printing sheet) by discharging the printing liquid (ink) as flying liquid droplets through fine discharge ports (orifices) is typically in the form of comprising a substrate (heater board) having a plurality of electrothermal converting elements and their lead electrodes, wherein said substrate has a nozzle layer of resin forming liquid channels (nozzles) and a common liquid chamber laid thereon, on which a ceiling plate of glass having a supply port of printing liquid is placed, but recently, a liquid jet head has been developed wherein the ceiling plate of glass is omitted, and a ceiling member made of resin (hereinafter referred to as "resin ceiling plate"), integrally provided with a supply port of recording liquid in addition to the liquid channels and a common liquid chamber, is molded as a piece by injection molding, and pressed onto and integrated with a substrate by a resilient member. Such liquid jet head is, owing to a greatly reduced number of components, and its quite simplified assembly process, expected to significantly contribute to lower costs of a liquid jet apparatus. Furthermore, since the junction between the ceiling member and the substrate is made by the resilient member, the liquid jet head with high reliability can be manufactured without risk of causing the adhesive to protrude out to deform some liquid channels, as will occur when the adhesive is used.

FIG. 14 shows a main section of a liquid jet head $E_0$ which uses a resin ceiling plate, with a part of the resin ceiling plate broken away, which comprises a substrate 1001 having a plurality of electrothermal converting elements 1001a, and the resin ceiling plate 1002 having liquid channels 1002a each located over an electrothermal converting element 1001a, and a common liquid chamber 1002b communicating to the liquid channels, the resin ceiling plate 1002 being integrally provided with an orifice plate portion 1002d having the discharge ports (orifices) 1002c each communicating to a liquid channel 1002a, and a cylindrical projecting portion 1002f having a printing liquid supply port 1002e opening to the common liquid chamber 1002b.

The resin ceiling plate 1002 having the orifice plate portion 1002d and the cylindrical projecting portion 1002f, in addition to the liquid channels 1002a and the common liquid chamber 1002b, is integrally formed by injection molding, and with each liquid channel 1002a positioned over an electrothermal converting element 1001a of the substrate 1001 (see FIG. 15), is pressed onto the substrate 1001 by a resilient member, not shown, and bonded together. The substrate 1001 is secured onto a base plate in wellknown manner, such as a screw, along with a wiring board 1003 having mounted a drive circuit for producing an electrical signal to each electrothermal converting element 1001a.

The liquid jet head $E_0$ assembled in this way is built into a cartridge 1006 by an external frame member 1005 containing a printing liquid supply member, as shown in FIG. 16. Note that the cartridge 1006 accommodates a sponge for imbibing and storing the printing liquid.

According to the above conventional technology, however, if the resin ceiling plate is pressed onto and bonded with the substrate by the resilient member, as previously described, the resin ceiling plate may be distorted due to a pressing force of the resilient member, causing the liquid channels or discharge orifices to be deformed, resulting in remarkably poor performance of liquid droplet discharge.

In particular, this problem is more significant in fabricating a long size liquid jet head of the full-line type, and when the resin ceiling plate is divided into a plurality of ceiling plate blocks, which are separately bonded with the substrate by means of resilient members, such a trouble may occur that the liquid droplet discharging performance may greatly differ between ceiling plate blocks, because the pressing force of each resilient member or its acting position is quite difficult to be equivalent.

In addition, since it may be insufficient to prevent leakage of the printing liquid only by pressing the resin ceiling plate onto the substrate by means of the resilient member, a liquid sealant is filled into a predetermined region, after the liquid jet head $E_0$ is assembled. However, if such sealant is used, the tactics may be longer due to the time required for the curing of sealant, resulting in greatly lower productivity of liquid jet head. In particular, in the case of the long size liquid jet head of the full-line type, as previously mentioned, since it is difficult to supply the sealant in proper quantities into predetermined region, the productivity may be remarkably lowered.

SUMMARY OF THE INVENTION

The present invention has been achieved in the light of the aforementioned problems associated with the conventional arts, and its object is to provide a liquid jet head in which the process of assembling a resin ceiling plate having the liquid channels and a common liquid chamber and a substrate is simple, without needs of resilient member for bonding both or any sealant for preventing leakage of the printing liquid from between the resin ceiling plate and the substrate, and its manufacturing method, as well as a liquid jet apparatus on which said liquid jet head is mounted.

To accomplish the above object, the liquid jet head of the present invention comprises a resin ceiling plate having the liquid channels for flowing the printing liquid therethrough, and a substrate having discharge energy generating means for discharging the printing liquid, characterized in that said resin ceiling plate and said substrate are integrated by welding both contact surfaces with a laser beam.

A manufacturing method of liquid jet head according to the present invention is characterized by including the steps of positioning a resin ceiling plate having the liquid channels on a substrate having discharge energy generating means, and directing a laser beam to the contact surfaces of said resin ceiling plate and said substrate from outside said resin ceiling plate to weld them together.

It is preferable to prepare a resin film having good adhesiveness with the resin ceiling plate on the surface of substrate.

Also, it is preferable to prepare an inorganic film having a reflectance of 60% or less for the laser beam on the surface of substrate.

Also, it is preferable to attach a laser beam absorbable substance on at least one of the contact surfaces of the substrate and the resin ceiling plate.

Also, it is preferable to provide a projecting portion on the resin ceiling plate, and bring the top end of said projecting portion into contact with the substrate, when positioning the resin ceiling plate on the substrate.

Since the contact surfaces of the substrate having discharge energy generating means and the resin ceiling plate having liquid channels are welded together with a laser beam such as a YAG laser, there is no need of the resilient member for bonding the substrate and the resin ceiling plate, and accordingly, the process of assembling the liquid jet head is simple, and the number of components to be assembled can be greatly reduced, without any risk of causing the resin ceiling plate to deform due to a pressing force of resilient member to degrade the shape precision of liquid channels.

Also, there is no need of filing any sealant to prevent leakage of the printing liquid from between the substrate and the resin ceiling plate.

Since resin materials such as polysulfone or polyether sulfone have lower absorptance of laser beam such as YAG laser, the resin ceiling plate is not greatly heated even if the laser beam is directed from outside the resin ceiling plate made of resin material, thereby making it possible to heat, fuse and weld only the contact surfaces of the resin ceiling plate and the substrate.

Also, if an inorganic film having a reflectance of 60% or less for laser beam is prepared on the surface of substrate, the energy loss of laser beam is reduced.

Accordingly, the substrate and the resin ceiling plate can be rapidly welded.

Also, if a laser beam absorbable substance is attached on at least one of the contact surfaces of the substrate and the resin ceiling plate, the energy loss of laser beam is reduced.

Also, if a projecting portion is provided on the resin ceiling plate, and the top end of the projecting portion is brought into contact with the substrate, when positioning the resin ceiling plate on the substrate, the energy of laser beam can be concentrated on the projecting portion of the resin ceiling plate, so that the substrate and the resin ceiling plate can be welded securely with less energy.

BRIEF DESCRIPTION OF THE DRAWINGS

FIGS. 3A and 3B show the contact surfaces of a substrate and a resin ceiling plate for the liquid jet head, wherein FIG. 3A is a typical perspective view showing the substrate and FIG. 3B is a typical perspective view showing the resin ceiling plate.

FIG. 4 is a typical cross-sectional view showing a first variation of the first embodiment.

FIG. 8 is a typical cross-sectional view showing a liquid jet head according to a second embodiment.

FIGS. 9A and 9B show the contact surfaces of the substrate and the resin ceiling plate for the liquid jet head as shown in FIG. 8, wherein FIG. 9A is a typical perspective view showing the substrate and FIG. 9B is a typical perspective view showing the resin ceiling plate.

FIG. 10 is a typical cross-sectional view showing a liquid jet head in cross section according to a third embodiment.

DETAILED DESCRIPTION OF THE PREFERRED EMBODIMENT

The embodiment of the present invention will be described below in connection with the drawings.

Figure 1:
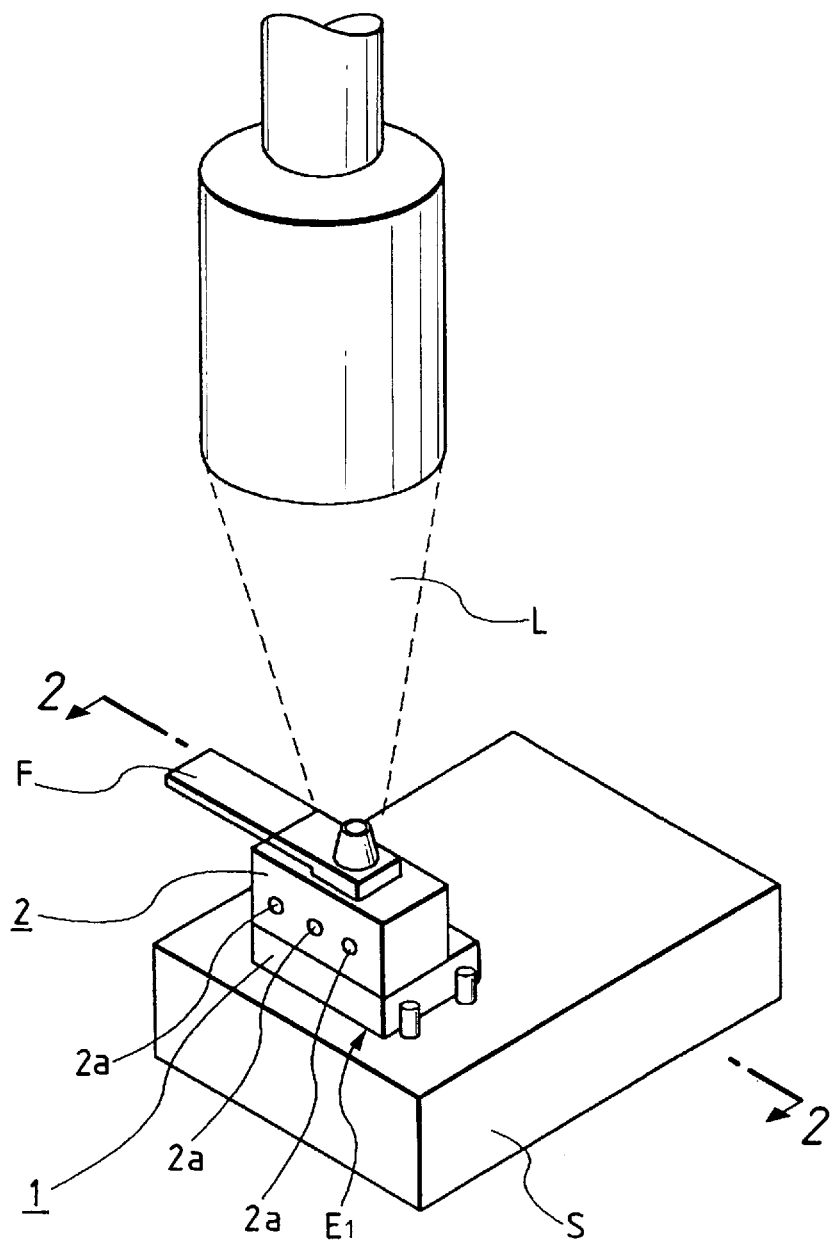
FIG. 1 is a typical perspective view showing a process of assembling a liquid jet head according to a first embodiment.

FIG. 1 is a typical perspective view illustrating an assembling method for a main section of a liquid jet head $E_1$ according to a first embodiment, wherein the assembling of the main section of the liquid jet head $E_1$ can be accomplished by placing, on an XY stage S, a substrate (heater board) 1 and a resin ceiling plate 2 which is positioned and superposed, and directing a focused laser beam L from a YAG laser to the contact surfaces of the resin ceiling plate 2 and the substrate 1, in the state with the resin ceiling plate 2 pressed onto the substrate by a finger F made of glass, thereby welding the resin ceiling plate 2 and the substrate 1 together.

Figure 2:
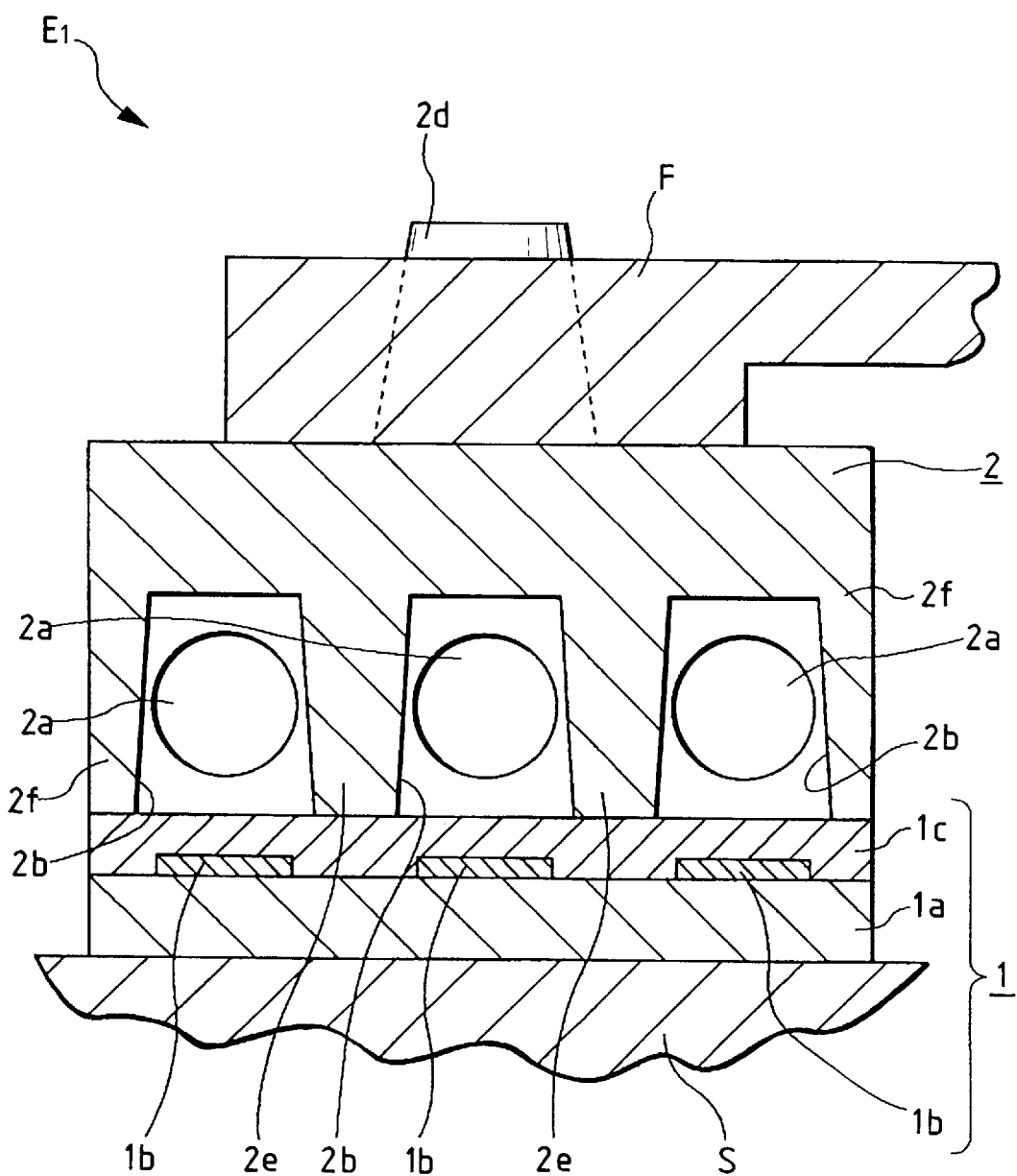
FIG. 2 is a typical cross-sectional view showing the liquid jet head in cross section taken along 2—2 line in FIG. 1.
Figure 3A:
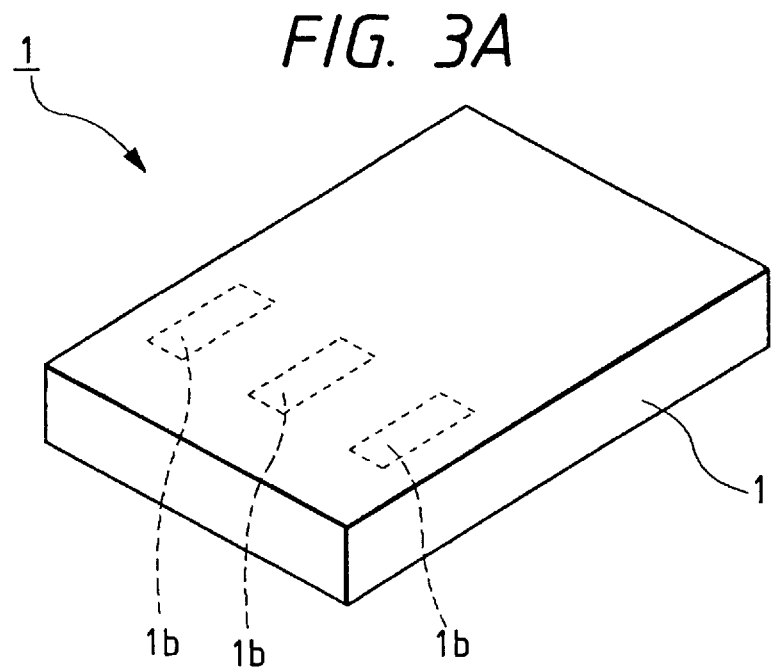
Figure 3B:
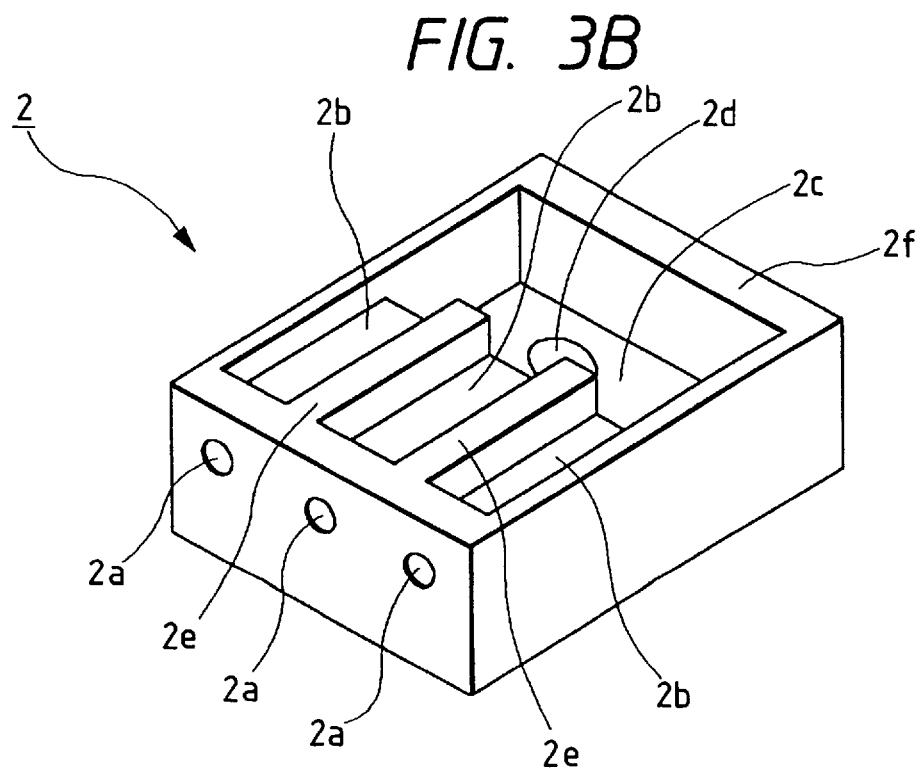

As shown in FIGS. 2, 3A and 3B, the substrate 1 is composed of a base 1a having a silicone substrate as base material, a plurality of electrothermal converting elements 1b which are discharge energy generating means formed on its surface, and a protective layer 1c for protecting them, the base 1a having an oxide layer on the surface of silicone substrate and a heat accumulating layer attached thereon, and each electrothermal converting element 1b being comprised of a part of a heating resistive layer, not shown, covering the surface of base 1a, which is exposed from the intermittent portion of a wiring pattern attached thereto. Also, the protective layer 1c comprises an insulating layer covering the electrothermal converting elements 1b and the wiring pattern which functions as the lead electrodes thereof, and a tantalum film for protecting it from cavitation of the printing liquid (ink).

The resin ceiling plate 2 has a plurality of orifices 2a opening to its one end face (front face), liquid channels (nozzles) 2b communicating to the respective orifices 2a, and a common liquid chamber 2c provided behind thereof, a printing liquid supply tube 2d for supplying the printing liquid (ink) to the common liquid chamber 2c extending upward on the top of the resin ceiling plate 2, the surface of a partition wall 2e between each liquid channel 2b and the end face of an external peripheral wall 2f around the resin ceiling plate 2 being pressed onto the surface of the substrate 1, heated, fused and welded with the substrate 1 by a laser beam L from YAG laser.

The resin ceiling plate 2 is made of polysulfone or polyether sulfone, and integrally molded by injection molding.

Polysulfone or polyether sulfone has no hydrogen bond in molecular structure, and therefore, a lower absorptance of laser beam particularly from the YAG laser, among many other resins, without any risk of fusing the resin ceiling plate 2 entirely even if light is converged through the resin ceiling plate 2 onto the contact surface with the substrate 1.

It should be noted that the XY stage S is moved in accordance with a predetermined program under the NC control, enabling all the contact surfaces of the substrate 1 and the resin ceiling plate 2 to be moved sequentially or continuously to a focus position of YAG laser.

The resin ceiling plate 2 has a higher transmittance to laser beam L from the YAG laser, as previously described, but if an optical system for converging the laser beam L has a large f number (focal distance divided by lens diameter), there is a risk that the resin ceiling plate 2 may be locally burned, even with a little absorption, when the intensity of laser beam L is higher. Thus, it is desirable that the optical system for converging the laser beam L may have a smaller f number.

Also, it is possible to prevent the resin ceiling plate 2 from burning by making the thickness of resin ceiling plate 2 smaller or weakening the intensity of laser beam L, even when the optical system of YAG laser has a large f number, whereby it is advantageous to combine these conditions for the optimization, to make the tactics as least as possible to enhance the productivity.

FIG. 4 shows a first variation. This is one in which a resin film 11 is preattached on the surface of a substrate 1.

A tantalum film is attached on the surface of the substrate 1, a s previously described, and since the tantalum film typically has a higher reflectance for the laser beam, a laser beam of high output must be utilized to weld this film directly onto the resin ceiling plate 2, with a risk that the dimensions of orifices 2a and liquid channels 2b may vary due to heat deformation of the resin ceiling plate 2, but the substrate 1 and the resin ceiling plate 2 can be welded together satisfactorily at relatively low temperatures by preattaching the resin film 11 which is liable to absorb the laser beam on the surface of substrate 1. It is desired that the resin film 11 on the surface of substrate 1 is patterned by a method as will be described later, because it is unnecessary on a portion facing each electrothermal converting element.

The material of resin film 11 may be any resins, as far as they are liable to absorb the laser beam, and have a high ink resistant property, and a heat resistant property capable of withstanding the service environment of the liquid jet head. These resins can be formed by dissolving them in a solvent, and applying and drying them on the substrate by solvent coating methods such as spin coat or bar coat. Also, the resins can be fused by heating and applied directly on the substrate by a hot melt method. The patterning of resin film 11 may rely on a method of applying a resin solution by means for enabling the patterning such as screen printing, a method of patterning after forming a resin membrane, or the use of a resin which allows for patterning by directing the light or ionizing radiation.

When the resin membrane has no photosensitivity, the patterning can be performed by the excimer laser beam, or means of etching the resin film by oxygen plasma after forming a pattern of photosensitive resin on the membrane. In particular, means of etching by oxygen plasma after patterning a silicone-type resist on the membrane has the advantages of having a smaller number of processes, allowing for the treatment of wafer collectively, and having a large etching selection ratio with the resin film, and is most preferable. The silicone-type resist may be FH-SP made by Fuji Hant Technology or SNR made by Tosoh. Etching by oxygen plasma can be performed by a normal RIE apparatus.

Photosensitive materials can be utilized for the resin membrane, but care must be taken in employing a novolak resin or an acrylic resin which is useful as the base resin of photosensitive material, and a photosensitive agent to be added, which do not have a sufficiently large ink resistant property. The photosensitive resins may include a positive-type photoresist composed of a mixture of novolak resin and naphthoquinone diazide derivative, a negative-type photoresist composed of a mixture of acrylic resin having unsaturated double bond and a photosensitive agent, and a rubber-type photoresist composed of a mixture of rubber-type polymeric material and azide compound.

When exposure means uses Deep-UV light which is ionizing radiation, electron beam or X ray, no photosensitive agent is fundamentally necessary, and polymeric materials other than novolak or acrylic resin as above cited can be used, whereby there is a broad selection range for resin. The resins may include chloromethyl polystyrene, chloromethyl poly-α-methylstyrene, and poly-4-vinylphenol.

Figure 5:
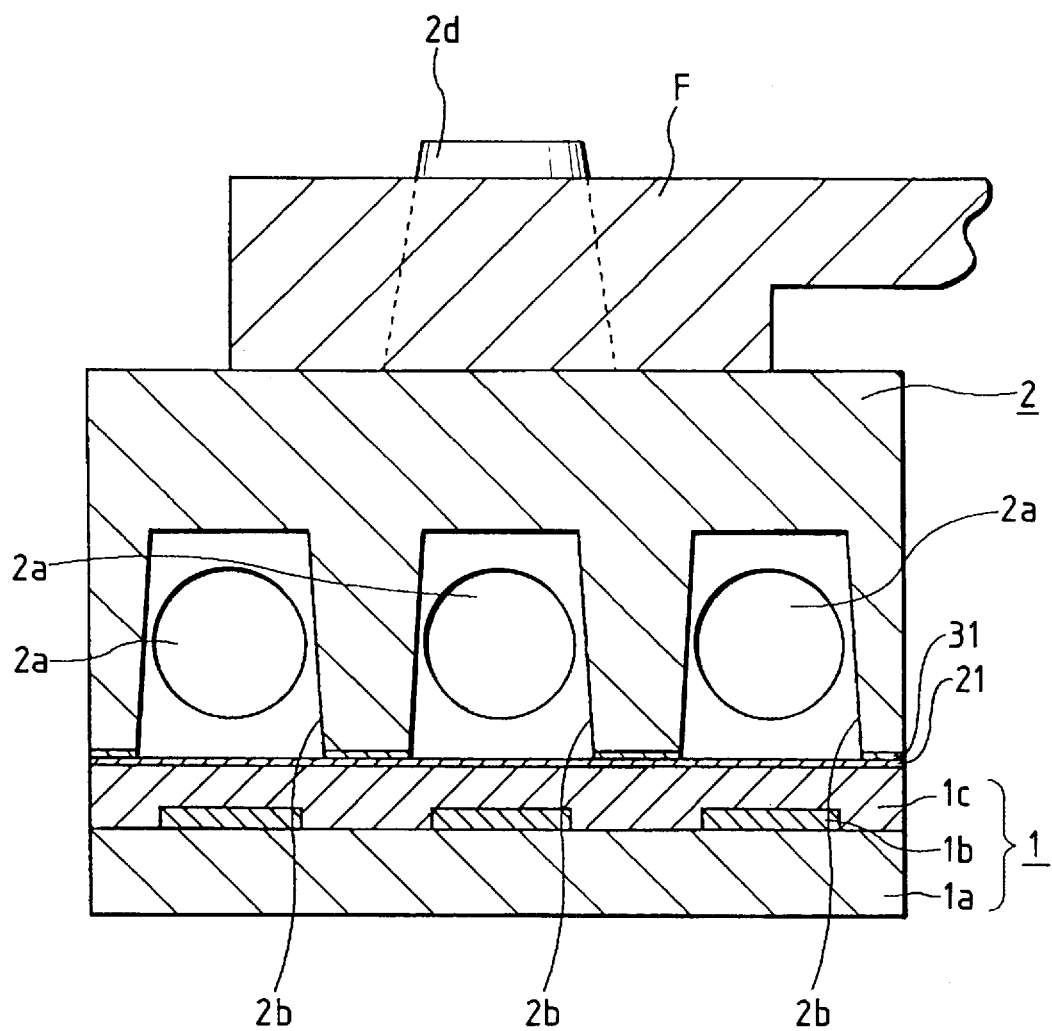
FIG. 5 is a typical cross-sectional view showing a second variation of the first embodiment.

FIG. 5 shows a second variation, wherein a tantalum film on the surface of a protective layer 1c for a substrate 1 is subjected to anode oxidization or gas phase oxidization to form a tantalum pentoxide film 21 which is an inorganic film, to which a resin film 31 similar to that of the first variation is attached.

The tantalum pentoxide film 21 is superior in the anti-cavitation property, like the tantalum film, with good adherence with various kinds of resin, and a reflectance as low as 60% or less for the laser beam L from the YAG laser.

Accordingly, the energy of laser beam L which has transmitted through the resin ceiling plate 2 can be mostly absorbed into the tantalum pentoxide film 21 and the resin film 31 to heat, fuse and weld the contact surfaces of the substrate 1 and the resin ceiling plate 2 instantaneously. Note that if the tantalum pentoxide film 21 alone is sufficient to absorb the laser beam L, the resin film 31 may be omitted.

In this way, if the tantalum pentoxide film 21 is formed on the surface of the substrate 1, the substrate 1 and the resin ceiling plate 2 can be sufficiently welded by collectively exposing the entire surface of substrate 1 or several blocks of substrate 1 to light, with the intervention of e.g. a metallic mask, without converging the laser beam L onto the contact surfaces of the substrate 1 and the resin ceiling plate 2.

If the collective exposure is used, the time required to assemble the substrate 1 and the resin ceiling plate 2 is significantly shortened, and additionally, since it is unnecessary to run the XY stage S minutely, the control apparatus can be considerably simplified, greatly contributing to lower prices of the liquid jet head.

Figure 6:
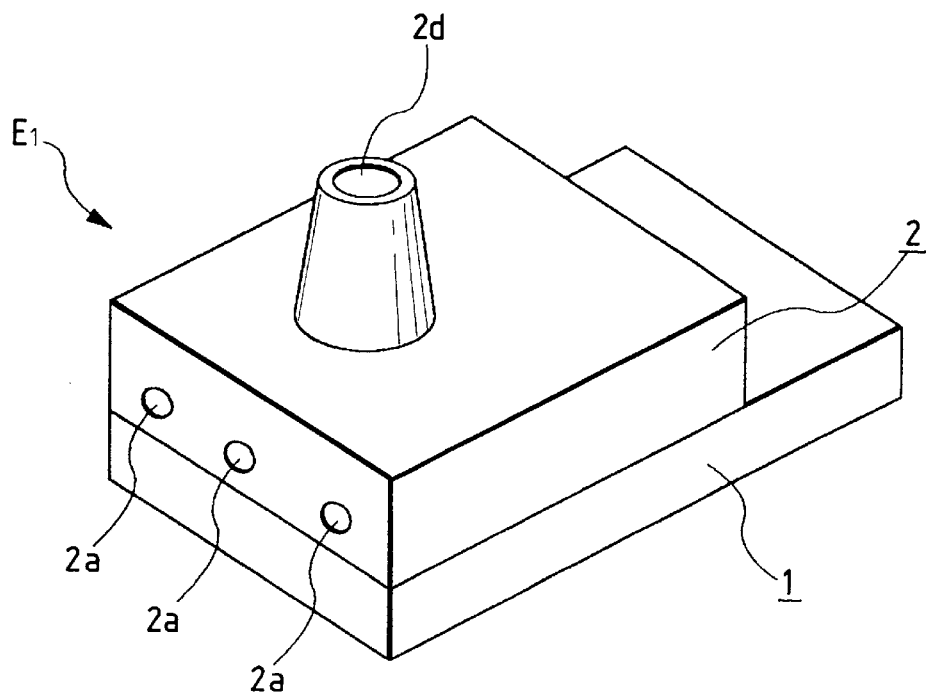
FIG. 6 is a typical perspective view showing the liquid jet head according to the first embodiment.

FIG. 6 is a perspective view showing-the appearance of a liquid jet head $E_1$ according to this embodiment. The substrate 1 and the resin ceiling plate 2 are joined together by welding with laser beam L, and does not need any resilient member, as was required in the conventional examples, with no risk that the resin ceiling plate 2 may be deformed due to pressing force.

In addition, the substrate 1 and the resin ceiling plate 2 are sufficiently sealed therebetween by welding, and does not require any sealing treatment using a sealant, as was performed in the conventional examples, so that the manufacturing process can be significantly simplified. Also, a liquid jet head which needs to seal the ink securely, like a head having four color inks as a unit, may use a sealant at the junction between the substrate and the resin ceiling plate, as conventionally performed, but in this case, the quantity of sealant to be used can be significantly reduced.

As a result, the liquid jet head with high shape precision of orifices or liquid channels and lower manufacturing costs can be realized.

Figure 7:
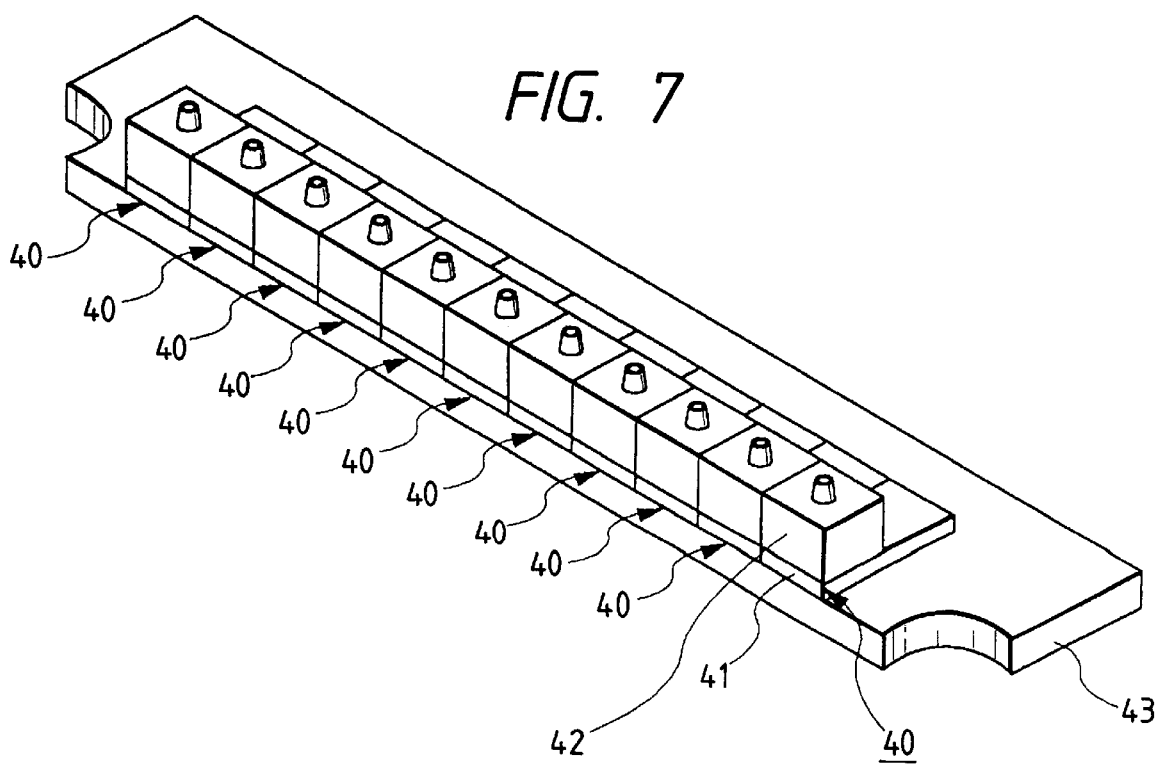
FIG. 7 is a typical perspective view showing a liquid jet head of full-line type.

In manufacturing a liquid jet head of the full-line type as shown in FIG. 7, it is only necessary to fix a number of liquid jet head units 40 built similarly to the liquid jet head $E_1$ according to this embodiment to a long size heat radiating plate 43. This assembling process is simpler than if the substrate 41 and the resin ceiling plate 42 of each liquid jet head unit 40 are integrated by the resilient member as in the conventional examples, and does not need sealant, whereby many troubles can be avoided. That is, there is no risk that sealant is distributed unevenly to cause the printing liquid to leak away from between the substrate 41 and the resin ceiling plate 42, and a misregistration of the resin ceiling plate 42 by the filing of sealant may occur. Accordingly, the manufacturing method of liquid jet head in this embodiment is extremely advantageous in manufacturing especially a long size liquid jet head.

The specific examples of this embodiment will be now described.

(First specific example)

A tantalum pentoxide film and a resin film are formed on a substrate, which is then welded with a resin ceiling plate by collective exposure.

First, the tantalum pentoxide film was formed on the substrate having formed thereon electrothermal converting elements, a wiring pattern made of aluminum, a protective film and a tantalum film as anti-cavitation layer by vacuum film formation and general photolithography technology, and then the resin film was formed thereon in the following manner.

A solution was prepared in which after polysulfone made by Amoco was dissolved in dichloroethane in tenfold quantity, and diluted twice in cyclohexanone, and applied by spin coating, this resin film being then prebaked at 90° C. for thirty minutes, and cured at 350° C. for ten minutes to enhance the adherence between the resin film and the tantalum pentoxide film. And then a positive-type photoresist containing silicone made by Fuji Hant Technology was applied by spin coating, this resist layer being prebaked in a hot plate at 120° C. for 120 seconds. The film thicknesses of these membranes were 0.2 µm for the tantalum pentoxide film, 1.0 µm for the resin film, and 0.5 µm for the positive-type resist layer.

Then, pattern exposure of 25 counts was performed to the resist by a mask aligner PLA-601 made by Canon. That pattern was formed so that the resin film might remain on the entire contact surfaces of the substrate and the resin ceiling plate. The development was made in a special developer FPH-5 by dipping for 90 seconds. The substrate was put into an RIE apparatus made by Nichiden Aneruba to conduct dry etching of resin film in oxygen plasma. The etching was performed at a gas pressure of 8 Pa, and an input electric power of 0.33W/cm², the etching time being 180 seconds. The substrate was directly washed in acetone to dissolve and remove the resist layer. Thereafter, the substrate was cut by a dicing saw, and was die bonded to a base plate made of aluminum. The base plate of aluminum was pasted with a circuit board having formed thereon a contact pad for the electrical connection to the printer, whereby the circuit board and the substrate having formed electrothermal converting elements were connected by wire bonding.

Then, a resin ceiling plate having a printing liquid supply tube, a common liquid chamber and the liquid channels was formed by injection molding, with the orifices opened by excimer laser, the resin ceiling plate being placed on the substrate and adsorbed to a glass finger to align the electrothermal converting elements on the substrate with the liquid channels on the resin ceiling plate. The alignment was performed by ascertaining the position of an alignment mark formed on the substrate through the image processing, and moving the glass finger while image processing the orifices with respect to that position.

Then, a laser beam was directed from YAG laser while the resin ceiling plate was pressed onto the substrate by the glass finger, with a laser irradiation apparatus LU100 made by Hitachi Const. Mach., the irradiation being performed with a pulse energy of 15J and a pulse width of 1 ms at 300 Hz for one second. Note that the XY stage was adjusted so that the substrate surface was 60 mm higher than the focus position. At that focus position, the beam diameter was ϕ20, whereby the laser irradiation was enabled over the entire area of the substrate (5×12 mm). Also, at a position 3 mm above the upper surface of glass finger, an apertured mask (7×14 mm) (made of nickel) corresponding to an irradiation area was installed to limit the irradiation area of laser.

In this way, the substrate and the resin ceiling plate could be welded rigidly.

(Second example)

A method of converging a laser beam from YAG laser through an optical system and irradiating only a welding region by moving a substrate under the NC control was adopted.

First, like the first specific example, a polysulfone resin film was formed on the surface of substrate and patterned. Then, a resin ceiling plate fabricated in the same way as in the first specific example was placed on and aligned with the substrate, and the laser irradiation was performed with the resin ceiling plate pressed onto the substrate surface by means of a glass finger. The laser irradiation was conducted by the same apparatus as in the first specific example, the height of XY stage being adjusted so that the substrate surface might be at a focal position. The laser pulse energy was 5J, the pulse width was 0.5 ms, and the cycle frequency was 300 Hz. Also, the optical system had an outgoing beam diameter of ϕ20, and a focal length of 40 mm.

A laser beam was directed to the ribs between as external peripheral wall of the resin ceiling plate and the liquid channels while moving the XY stage at a speed of 0.5 m/sec under the irradiation conditions as above cited.

In this way, the substrate and the resin ceiling plate could be welded rigidly.

(Third specific example)

A tantalum pentoxide film was only formed on the substrate surface, and a substrate and a resin ceiling plate were welded together.

First, the substrate having formed thereon the tantalum pentoxide film by vacuum film formation, as in the first specific example, was cut by a dicing saw, and die bonded to a base plate made of aluminum. Then, the resin ceiling plate was placed on and aligned with the substrate, and a laser beam from YAG laser was directed while pressing the resin ceiling plate onto the substrate by a glass finger. In this specific example, the laser irradiation time was as long as five seconds, because no resin film was formed on the surface of substrate. As a result, the resin ceiling plate could be rigidly welded.

(Fourth specific example)

A tantalum pentoxide film was not provided on the substrate surface, and the contact surfaces of a substrate and a resin ceiling plate was irradiated by focusing a laser beam from YAG laser thereto.

First, the substrate fabricated in the same way as in the first specific example was cut by a dicing saw, and die bonded to a base plate made of aluminum. Then, the resin ceiling plate was placed on and aligned with the substrate, and a laser beam was directed in the same way as in the second specific example while pressing the resin ceiling plate onto the substrate by a glass finger. The moving speed of an XY stage was as slow as 0.2 m/sec. As a result, the resin ceiling plate and the substrate could be rigidly welded.

Figure 9A:
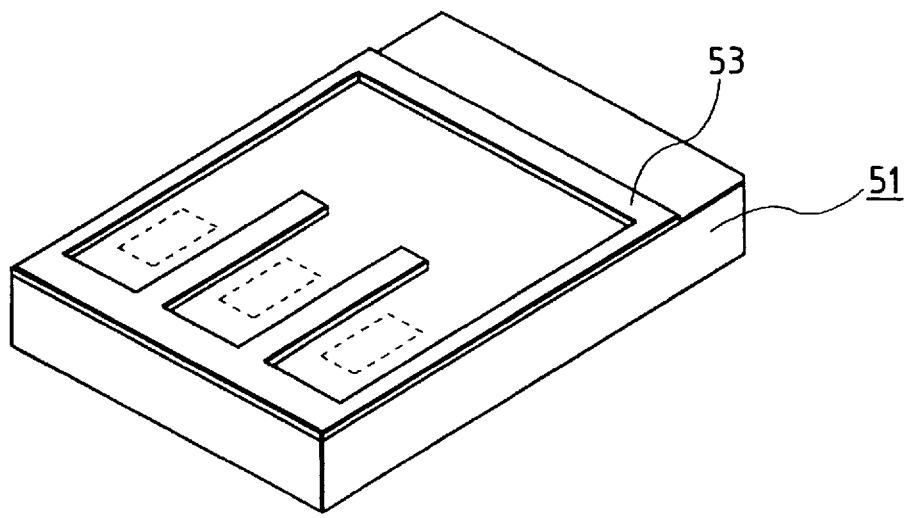
Figure 9B:
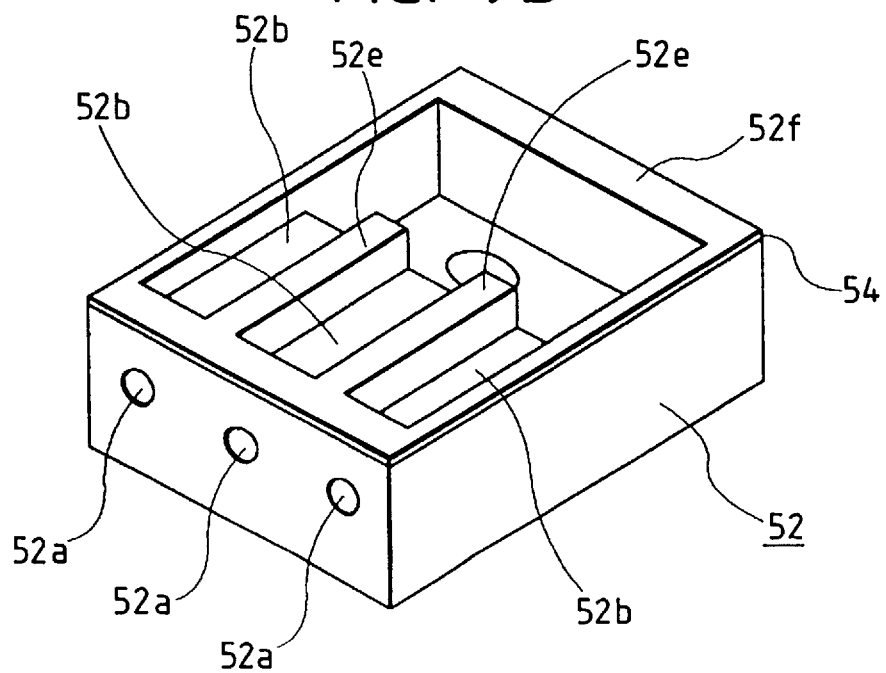

FIG. 8 shows a liquid jet head $E_2$ according to a second embodiment, wherein the resin films 53, 54 containing an absorbent for laser beam from YAG laser are attached on respective contact surfaces of a substrate 51 and a resin ceiling plate 52 which are equivalent to the substrate 1 and the resin ceiling plate 2 in the first embodiment, to weld the substrate 51 and the resin ceiling plate 52 securely with less energy. FIG. 9 is a perspective view showing respective contact surfaces of the substrate 51 and the resin ceiling plate 52 onto which resin films 53, 54 were attached.

That is, by using the irradiating laser beam with lower energy, the laser energy to be absorbed into the resin ceiling plate 52 can be reduced to prevent thermal deformation of the resin ceiling plate 52, thereby avoiding any decrease in dimensional precision of the orifices 52a or liquid channels 52b. Note that the resin film 53 attached on the substrate 51 was formed and patterned in the same way as the resin film 11 in the first variation of the first embodiment, and the resin film 54 of the resin ceiling plate 52 was obtained by applying a liquid resin on the end face of each rib 52e and an external peripheral wall 52f by flexographic printing, screen printing, or offset printing.

The resin material which becomes a parent material for each of resin films 53, 54 has a melting temperature as high as the melting temperature of the resin ceiling plate 52, preferably having a higher adherence with the resin ceiling plate 52. Also, any resin material can be used which has a higher ink resistant property and a heat resistance capable of withstanding the service environment of the liquid jet head $E_2$, but optimally may be similar to that of the resin ceiling plate 52.

Specifically, such resin materials may include polyacetal, polyether sulfone, polyether ether ketone, polyarylate, polysulfone, and polyphenylene sulfide.

Also, the absorbents for laser beam contained in each resin film 53, 54 may include carbon particles, and near infrared ray absorbable dyes. Specific examples of materials for absorbing near infrared rays may include the following materials manufactured by Mitsui Toatsu Dye: SIR-114 (anthraquinone dye), SIR-128, SIR-130, SIR-132, SIR-159, SIR-162, PA-1001, PA-1006 (metal complex dye), SIR-103, and KIR-103 (phthalocyanine dye).

Each of these absorbents has absorption near a wavelength of 1064 nm of the laser beam from YAG laser, and can be used in the state where it is precontained in the resin material as above cited, or may be diffused after applying only the resin material on the substrate 51 and the resin ceiling plate 52.

Note that if the absorption of laser beam is sufficient, a resin film containing an absorbent may be provided on either one of the substrate and the resin ceiling plate.

Specific examples of this embodiment will be further described below.

(Fifth example)

First, polysulfone was dissolved in dichloromethane, to prepare 2% solution. Then, 0.5% SIR-1288 (near infrared absorbent made by Mitsui Toatsu Dye) was dissolved in it. This solution was spin coated at a rotational speed of 3000 rpm onto a substrate having 128 electrothermal converting elements (material: $HfB_2$).

This was dried at 80° C. for thirty minutes to obtain an applied layer. The thickness was 2 $\mu$m. Then, this substrate was set on an XY stage, and by controlling a KrF excimer laser oscillator with its oscillation, along with the movement of the XY stage, the applied layer was removed except for a portion in contact with the resin ceiling plate, to form a resin film. Then, a resin ceiling plate made of polysulfone which was fabricated by injection molding was aligned with the substrate, slightly pressed by a finger made of glass, and set on a YAG laser oscillator, whereby one pulse of 0.5 mJ/puls.cm$^2$ was directed beyond the finger and the resin ceiling plate. Thereby, the substrate and the resin ceiling plate were sufficiently welded together. There was no appreciable deformation of orifices or liquid channels at all, and the liquid jet head as the product had an excellent printing quality, without appreciable deterioration over the long-term service.

(Sixth specific example)

55 liquid jet heads manufactured in the same way as in the fifth specific example were divided into five blocks each having 11 heads, and fixed to a heat radiating plate to fabricate five liquid jet heads of full-line type. The investigation of the printing quality revealed that each liquid jet head was excellent, with no deterioration over the long-term service, and without little appreciable dispersion between products.

(Seventh specific example)

A liquid jet head was fabricated in the same way as in the fifth specific example, except that a polysulfone solution containing 0.3% carbon was used instead of dye in the fifth specific example. The printing quality was excellent, with no such troubles that the resin ceiling plate was peeled off over the long-term service, and there was no appreciable deterioration in the printing quality.

(Eighth specific example)

55 liquid jet heads like those of the seventh specific example were fabricated and divided into five blocks each having 11 heads, and fixed to a heat radiating plate to fabricate five liquid jet heads of full-line type. The investigation of the printing quality revealed that each liquid jet head was excellent, with no deterioration over the long-term service, and without little appreciable dispersion between products.

FIG. 10 shows a liquid jet head $E_3$ according to a third embodiment, which is fabricated by providing minute columnar projections 63 which are tapered projecting portions on the end face of each rib 62e and an external peripheral wall 62f for a resin ceiling plate 62 which is similar to the resin ceiling plate 2 in the first embodiment, and concentrating the energy of laser beam from YAG laser onto each columnar projection 63, to weld the resin ceiling plate 2 with a substrate. The remaining portion of the resin ceiling plate 62 was little heated, so that they could be rigidly welded using a laser beam with lower energy. Accordingly, there is no risk that the dimensional precision of orifices 62a or liquid channels 62b may be degraded.

To provide the columnar projections 63 on the end face of resin ceiling plate 62, it is only necessary to form the recesses of inverse shape to that of columnar projections 63 in a mold in injection molding the resin ceiling plate 62. This can be accomplished by colliding fine particles of high hardness to the mold, pressing a tool having above fine particles attached onto the mold, or scribing using a carbide tool.

Figure 11:
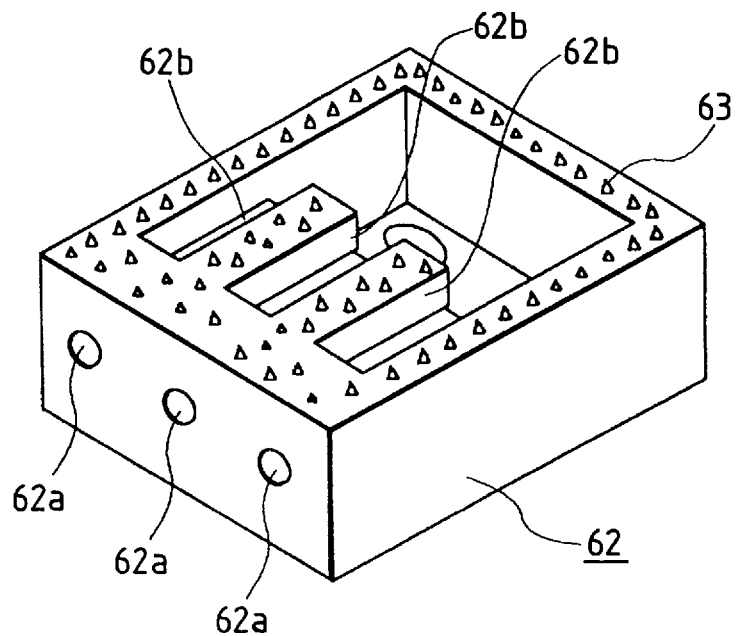
FIG. 11 is a typical perspective view showing the liquid jet head as shown in FIG. 10, with the resin ceiling plate turned upside down.
Figure 12:
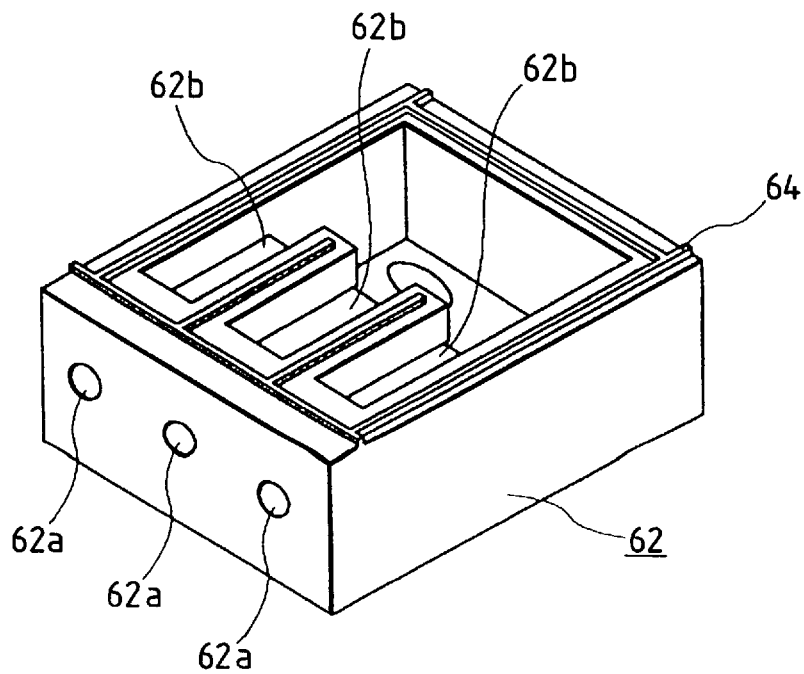
FIG. 12 is a typical perspective view of the liquid jet head according to one variation of the third embodiment, with the resin ceiling plate turned upside down.
Figure 13:
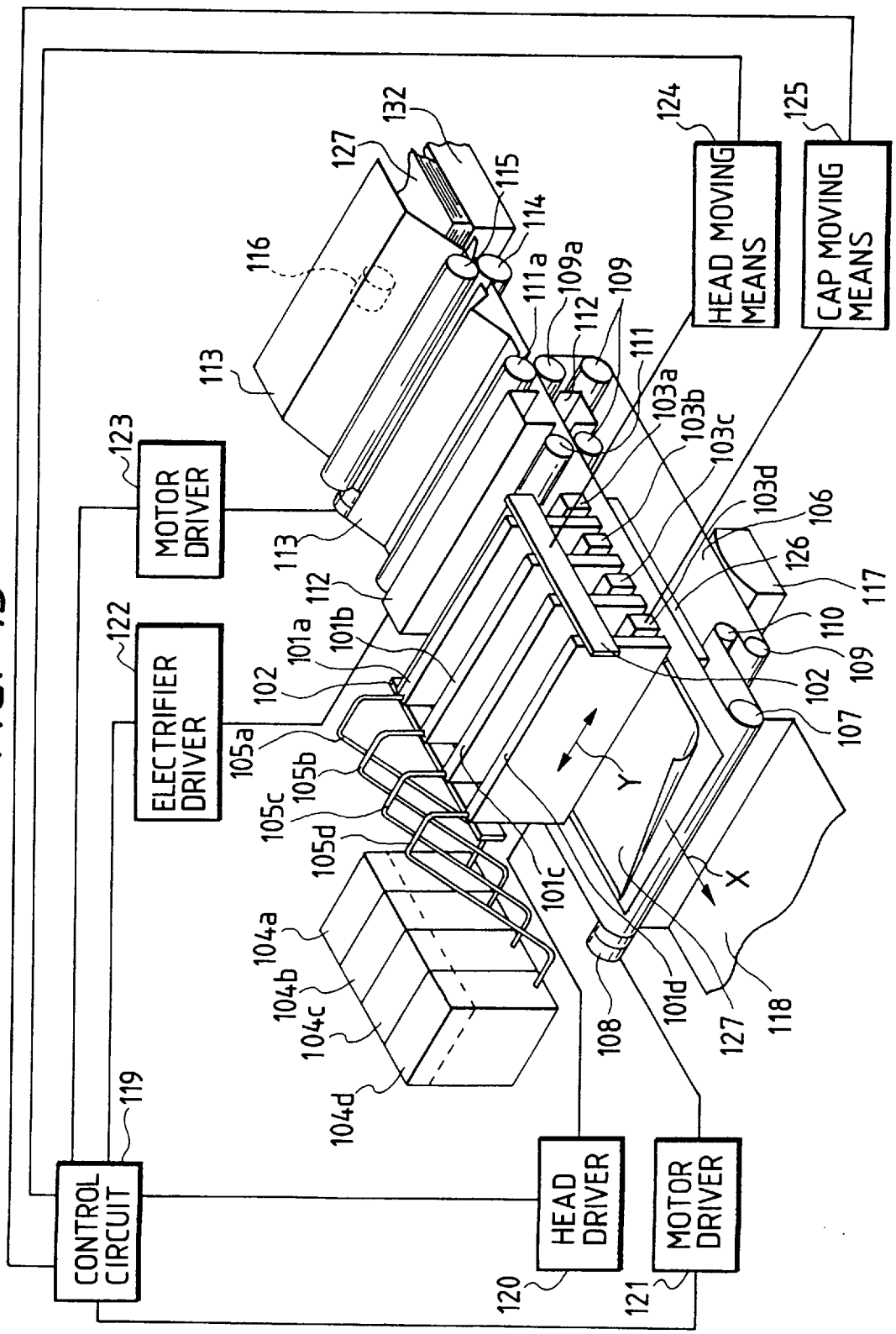
FIG. 13 is a typical perspective view illustrating a liquid jet apparatus.
Figure 14:
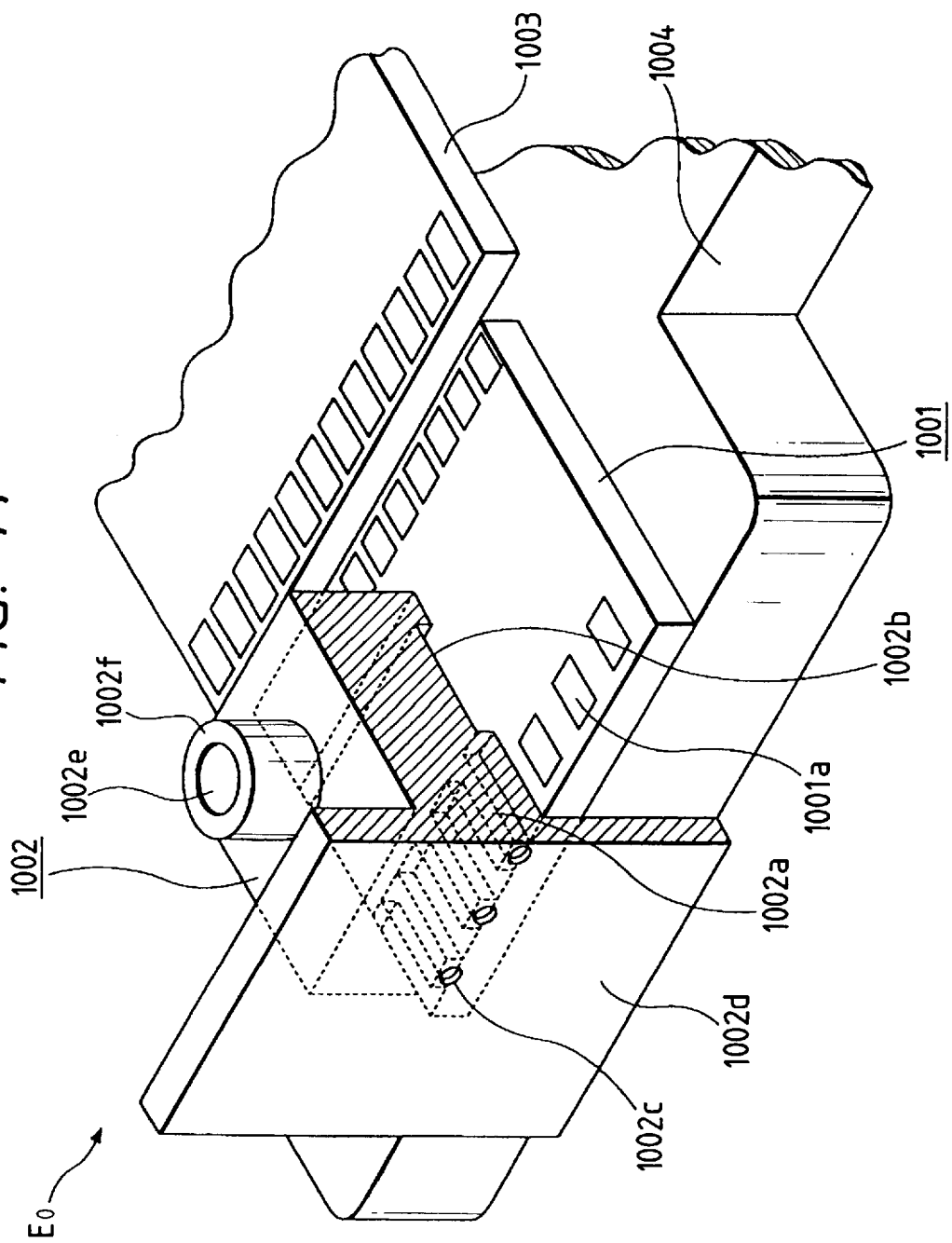
FIG. 14 is a typical perspective view illustrating a liquid jet head having a resin ceiling plate having a nozzle layer and a ceiling plate joined and a substrate.
Figure 15:
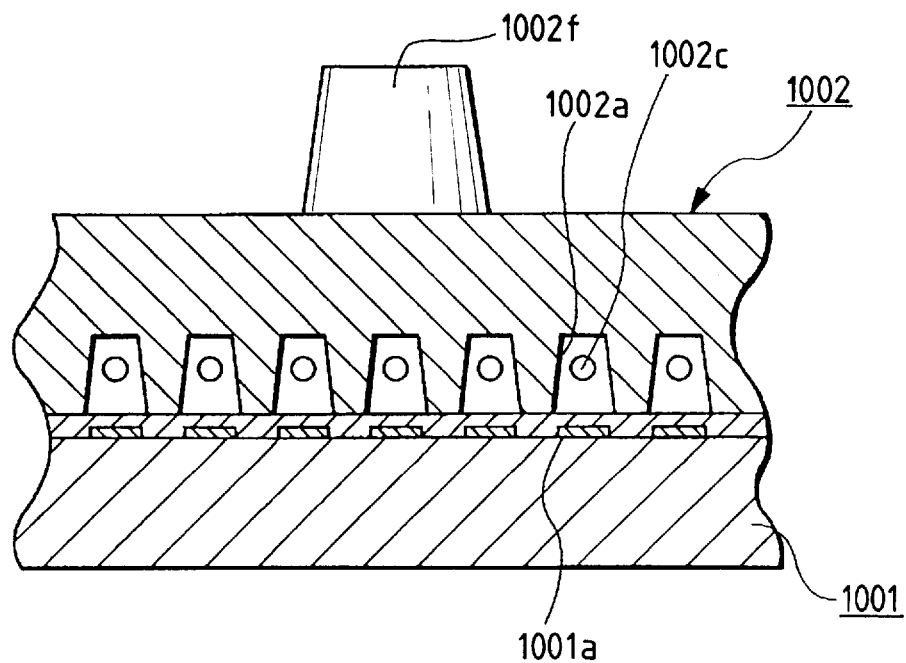
FIG. 15 is a typical cross-sectional view showing, in cross section, the resin ceiling plate and the substrate as shown in FIG. 14.
Figure 16:
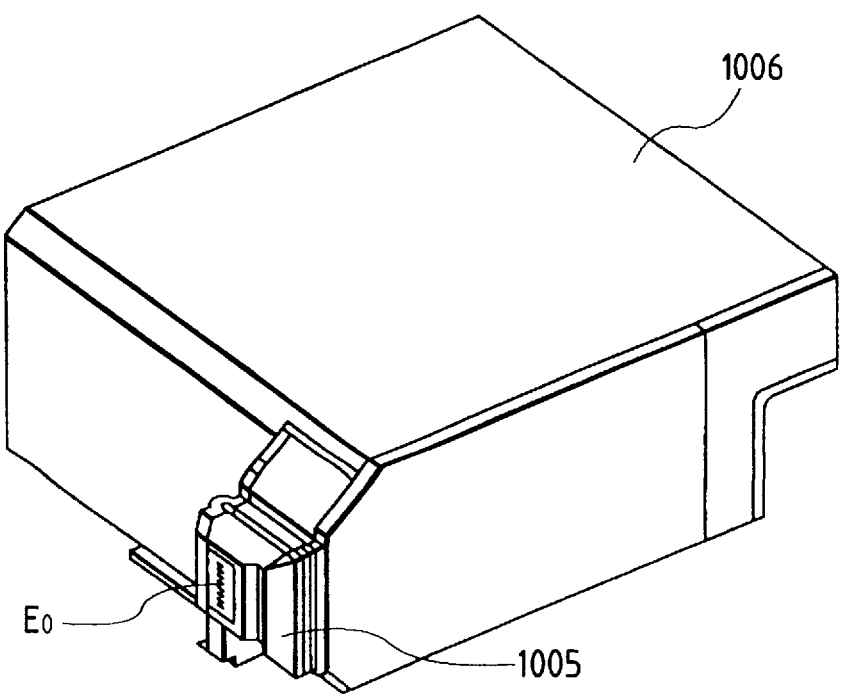
FIG. 16 is a typical perspective view showing the state where the liquid jet head of FIG. 14 is built into a cartridge.

Note that FIG. 11 shows the resin ceiling plate 62 having columnar projections 63, turned upside down, but rib-like projections 64 extending along each end face and having a tapered cross-section as shown in FIG. 12, may be used, instead of columnar projections 63.

Also, if the resin films like the resin films 11, 31, 53 in the first embodiment and the second embodiment may be formed and patterned on the surface of substrate 61, the substrate 61 and the resin ceiling plate 62 can be welded together more securely.

Specific examples of this embodiment will be further described below.

(Ninth specific example)

First, polysulfone was dissolved in dichloromethane, prepare 2% solution. Then, this solution was spin coated at rotational speed of 3000 rpm on a substrate having 12 electrothermal converting elements (material: $HfB_2$).

This was dried at 80° C. for thirty minutes to obtain an applied layer. The thickness was 2 $\mu$m. Then, this substrate was set on an XY stage, a KrF excimer laser oscillating apparatus was controlled with its oscillation, while being interlocked with the movement of the XY stage, the applied layer was removed except for a portion in contact with the resin ceiling plate, to form a resin film. Then, a resin ceiling plate made of polysulfone which was molded using a mold with a recess formed by the top end of a carbide tool, was aligned with the substrate, and slightly pressed by a finger made of glass. The substrate and the resin ceiling plate thus positioned were set on a YAG laser oscillating apparatus, whereby one pulse of 1.5 mJ/puls.cm$^2$ was radiated beyond the finger made of glass and the resin ceiling plate. Thereby, the substrate and the resin ceiling plate were sufficiently welded together. There was no appreciable deformation of orifices or liquid channels at all, with an excellent printing quality of liquid jet head as the product, and there was no appreciable deterioration over the long-term service.

(Tenth specific example)

55 liquid jet heads manufactured in the same way as in the ninth specific example were grouped into five blocks each having 11 heads, and fixed to a heat radiating plate to fabricate five liquid jet heads of full-line type. The investigation of the printing quality revealed that each liquid jet head was excellent, with no deterioration over the long-term service, and without little appreciable dispersion between products.

(Eleventh specific example)

A liquid jet head was fabricated in the same way as in the ninth specific example, except that the resin ceiling plate made of polysulfone was injection molded using a mold with a streak-like recess formed by scribing with a carbide tool, instead of using a mold with a streak-like recess formed by the top end of a carbide tool as in the ninth specific example. The substrate and the resin ceiling plate were sufficiently welded together. There was no appreciable deformation of orifices or liquid channels at all, with an excellent printing quality of the liquid jet head, and there was no appreciable exfoliation of the resin ceiling plate or deterioration in printing quality over the long-term service.

(Twelfth specific example)

55 liquid jet heads manufactured in the same way as in the eleventh specific example were divided into five blocks each having 11 heads, and fixed to a heat-radiating plate to fabricate five liquid jet heads of full-line type. The investigation of the printing quality revealed that each liquid jet head was excellent, with no deterioration over the long-term service, and without little appreciable dispersion between products.

Next, a liquid jet apparatus with a liquid jet head of the present invention mounted will be described below.

In FIG. 13, 101a to 101d are liquid jet heads (hereinafter referred to as "head") of the full-line type, which are securely held within a holder 102 with a predetermined spacing in a direction indicated by the arrow X and in parallel to each other. On the bottom face of each head 101a to 101d, 3456 discharge ports are disposed downwardly at 16 discharge ports/mm in one column along a direction of the arrow Y, thereby allowing for printing with a width of 216 mm.

These heads 101a to 101d is of the type of discharging the printing liquid by using heat energy, the discharging being controlled by a head driver 120.

Note that a head unit is constituted of the heads 101a to 101d and the holder 102, the head unit being movable up and down by head moving means 124.

Also, note that the caps 103a to 103d corresponding to the heads 101a to 101d and disposed adjacent the bottom portion thereof each have an ink absorbing member such as a sponge internally.

The caps 103a to 103d are securely held by the holder, not shown, a cap unit is constituted of the holder and the caps 103a to 103d, the cap unit being movable in the direction of the arrow X by cap moving means 125.

Each head 101a to 101d is supplied with each color ink of cyan, magenta, yellow or black through an ink supply tube 105a to 105d from an ink tank 104a to 104d, enabling the color print.

Also, this ink supply relies on the capillary phenomenon of head discharge ports, the liquid level of each ink tank 104a to 104d being set a certain distance below a discharge port level.

Next, a conveying device for conveying the printing medium, opposed to the liquid jet head, will be described.

A belt 106 is to convey a printing sheet 127 which is the printing medium, and is comprised of an electrifiable seamless belt.

The belt 106 is looped along a predetermined path around a drive roller 107, idler rollers 109, 109a and a tension roller 110, and connected to the drive roller 107 to be run by a belt drive motor 108 which is driven by a motor driver 121.

The belt 106 is run in the direction of the arrow X directly under the discharge ports for the heads 101a to 101d, and restrained from deflecting downward by a fixture support member 126.

Beneath the belt 106, a cleaning unit 117 is disposed to remove the paper powder sticking to the surface of belt 106, as shown in the figure.

An electrifier 112 for electrifying the belt 106 is turned on or off by an electrifier driver 122, and owing to an electrostatic adsorption force by this electrification, the recording sheet 127 is adsorbed onto the belt 106.

In front of and behind the electrifier 112, pinch rollers 111, 111a are disposed to force the printing sheet 127 to be conveyed onto the belt 106, in cooperation with the idler rollers 109, 109a.

The printing sheets 127 within a paper supply cassette 113 are delivered one at a time by the rotation of a paper supply roller 116, and conveyed to an angle guide 113 in the direction of the arrow X by the conveying roller 114 to be driven by the motor driver 123 and the pinch roller 115. The angle guide 113 has an angle space permitting a flexure of the printing sheet 127.

The printing sheet 127 after being printed is exhausted into a paper exhausting tray.

The head driver 120, head moving means 124, cap moving means 125, motor drivers 121, 123, and electrifier driver 122 are all controlled by a control circuit.

The present invention brings about excellent effects particularly in a liquid jet head or a liquid jet apparatus of liquid jet system of performing the printing by forming flying liquid droplets with the heat energy among the various liquid jet systems.

As to its representative constitution and principle, for example, one practiced by use of the basic principle disclosed in, for example, U.S. Pat. Nos. 4,723,129 and 4,740,796 is preferred. This printing system is applicable to either of the so-called on-demand type and the continuous type.

Briefly stated, this printing system involves applying at least one driving signal, via drive means, which gives rapid temperature elevation exceeding nucleus boiling and causing film boiling in the printing liquid (ink), corresponding to the printing information, to electrothermal converting elements as discharge energy generating means arranged corresponding to the sheets or liquid channels holding a printing liquid (ink), heat energy is generated at the electrothermal converting elements to effect film boiling at the heat acting surface of the liquid jet head. Particularly, this printing system is effective for the on-demand type because bubbles can be formed from the printing liquid (ink), corresponding one-to-one to the driving signals to be applied to the electricity-heat convertors. By discharging the printing liquid (ink) through an opening for discharging by growth and shrinkage of this bubble, at least one droplet is formed. By making the driving signals into the pulse shapes, growth and shrinkage of the bubbles can be effected instantly and adequately to accomplish more preferably discharging of the liquid (ink) particularly excellent in response characteristic. As the driving signals of such pulse shape, those as disclosed in U.S. Pats. Nos. 4,463,359 and 4,345,262 are suitable. Further excellent printing can be performed by employment of the conditions described in U.S. Pat. No. 4,313,124 of the invention concerning the temperature elevation rate of the above-mentioned heat acting surface.

As the constitution of the liquid jet head, in addition to the combination of the discharging orifice, liquid channel, and electrothermal converting element (linear liquid channel or right-angled liquid channel) as disclosed in the above-mentioned respective specifications, the constitution by use of U.S. Pat. No. 4,558,333 or 4,459,600 disclosing the constitution having the heat acting portion arranged in the flexed region is also included in the present invention.

In addition, the present invention can be also effectively made the constitution as disclosed in Japanese Laid-Open Patent Application No. 59-123670 which discloses the constitution using a slit common to a plurality of electrothermal converting elements as the discharging portion of the electrothermal converting element or Japanese Laid-Open Patent Application No. 59-138461 which discloses the constitution having the opening for absorbing pressure wave of heat energy correspondent to the discharging portion.

Furthermore, the liquid jet head to which the present invention is effectively applied is of serial type in which the head is mounted on a carriage to run therealong.

In addition, the present invention is effective for a liquid jet head of the freely exchangeable chip type which enables electrical connection to the main device or supply of ink from the main device by being mounted on the main device, or a liquid jet head of the cartridge type provided integrally on the liquid jet head itself.

Also, addition of a restoration means for the liquid jet head, a preliminary auxiliary means to the liquid jet device of the present invention is preferable, because the liquid jet apparatus can be further stabilized. Specific examples of these may include, for the liquid jet head, capping means, cleaning means, pressurization or suction means, electrothermal converting elements or another type of heating elements, or preliminary heating means according to a combination of these, and it is also effective for performing stable printing to add means for preliminary discharge mode which performs discharging separate from recording.

Further, as the printing mode of the liquid jet apparatus, the present invention is extremely effective for not only the printing mode only of a primary color such as black, etc., but also a device equipped with at least one of plural different colors or full color by color mixing, whether the liquid jet head may be constituted integrally or combined in plural number.

The most effective method for the inks as above cited in the present invention relies on performing the film boiling system as previously described.

Further additionally, an ink jet apparatus according to the present invention may be used in the form of an image output terminal in an information processing equipment such as a computer, a copying machine in combination with a reader, or a facsimile terminal equipment having the transmission and reception feature.

What is claimed is:

1. A manufacturing method of a liquid jet head comprising the discharge ports for discharging the ink, the liquid channels in communication to said discharge ports, and energy generating means for generating the energy for use in discharging the ink, including the steps of:

preparing a substrate having said energy generating means;

preparing a resin ceiling plate fabricated by molding and having the grooves which constitute part of said liquid channels;

positioning and contacting said ceiling plate on and with said substrate so that said grooves may be located above said energy generating means; and forming said liquid channels constituted of said grooves and said substrate by directing a laser beam from outside said ceiling plate in the state where said ceiling plate and said substrate are joined, to weld together said ceiling plate and said substrate.

2. A manufacturing method of a liquid jet head according to claim 1, wherein said laser beam is emitted from a YAG laser.

3. A manufacturing method of a liquid jet head according to claim 2, wherein the resin constituting said ceiling plate is polysulfone or polyether sulfone.

4. A manufacturing method of a liquid jet head according to claim 1, wherein an inorganic film having a reflectance of 60% or less for the laser beam is provided on the surface of said substrate.

5. A manufacturing method of a liquid jet head according to claim 1, wherein a laser beam absorbable substance is attached on at least one of the contact surfaces of said substrate and said ceiling plate.

6. A manufacturing method of a liquid jet head according to claim 1, wherein said laser beam absorbable substance is a blend of carbon particles or near infrared radiation absorbable dye into the resin.

7. A manufacturing method of a liquid jet head according to claim 6, wherein said laser beam absorbable substance is a blend of carbon particles or near infrared radiation absorbable dye into the same resin as the resin forming the ceiling plate.

8. A manufacturing method of a liquid jet head according to claim 1, wherein the contact region of said ceiling plate with said substrate is formed with projecting portions.

9. A manufacturing method of a liquid jet head according to claim 8, wherein said projecting portions are tapered columnar projections.

10. A manufacturing method of a liquid jet head according to claim 8, wherein said projecting portions are rib-like projections having a tapered cross section.

11. A liquid jet head comprising the discharge ports for discharging the ink, the liquid channels in communication to said discharge ports, and energy generating means for generating the energy for use in discharging the ink, said head being manufacturing a manufacturing method including the steps of:

preparing a substrate having said energy generating means;

preparing a resin ceiling plate fabricated by molding and having the grooves which constitute part of said liquid channels;

positioning and contacting said ceiling plate on and with said substrate so that said grooves may be located above said energy generating means; and forming said liquid channels constituted of said grooves and said substrate by directing a laser beam from outside said ceiling plate in the state where said ceiling plate and said substrate are joined, to weld together said ceiling plate and said substrate.

12. A liquid jet head according to claim 11, wherein said laser beam is emitted from a YAG laser.

13. A liquid jet head according to claim 12, wherein the resin constituting said ceiling plate is polysulfone or polyether sulfone.

14. A liquid jet head according to claim 11, wherein an inorganic film having a reflectance of 60% or less for the laser beam is provided on the surface of said substrate.

15. A liquid jet head according to claim 11, wherein a laser beam absorbable substance is attached on at least one of the contact surfaces of said substrate and said ceiling plate.

16. A liquid jet head according to claim 15, wherein said laser beam absorbable substance is a blend of carbon particles or near infrared radiation absorbable dye into the resin.

17. A liquid jet head according to claim 16, wherein said laser beam absorbable substance is a blend of carbon particles or near infrared radiation absorbable dye into the same resin as the resin forming the ceiling plate.

18. A liquid jet head according to claim 11, wherein the contact portion of said ceiling plate with said substrate is formed with projecting portions.

19. A liquid jet head according to claim 18, wherein said projecting portions are tapered columnar projections.

20. A liquid jet head according to claim 18, wherein said projecting portions are rib-like projections having a tapered cross section.

* * * * *

UNITED STATES PATENT AND TRADEMARK OFFICE
CERTIFICATE OF CORRECTION

PATENT NO. : 5,808,641

DATED : September 15, 1998

INVENTOR(S): MASASHI MIYAGAWA, ET AL.

It is certified that error appears in the above-identified patent and that said Letters Patent is hereby corrected as shown below:

COLUMN 1

Line 17, "of" should be deleted.
Line 31, "components," should read --components--.

COLUMN 2

Line 26, "lower" should read --lowered--.
Line 30, "into" should read --into the--.
Line 59, "of" should read --of the--.
Line 64, "of" should read --of the--.

COLUMN 3

Line 12, "reduced," should read --reduced--.

COLUMN 5

Line 2, "and" should be deleted.
Line 34, "a s" should read --as--.

UNITED STATES PATENT AND TRADEMARK OFFICE
CERTIFICATE OF CORRECTION

PATENT NO. : 5,808,641

DATED : September 15, 1998

INVENTOR(S): MASASHI MIYAGAWA, ET AL.

It is certified that error appears in the above-identified patent and that said Letters Patent is hereby corrected as shown below:

COLUMN 6

Line 58, "showing-the" should read --showing the--.

COLUMN 7

Line 61, "8 Pa," should read --8Pa,--.

COLUMN 8

Line 29, "(Second" should read --(Second specific--.

COLUMN 9

Line 4, "was" should read --were--.

UNITED STATES PATENT AND TRADEMARK OFFICE
CERTIFICATE OF CORRECTION

PATENT NO. : 5,808,641

DATED : September 15, 1998

INVENTOR(S): MASASHI MIYAGAWA, ET AL.

Page 3 of 3

It is certified that error appears in the above-identified patent and that said Letters Patent is hereby corrected as shown below:

COLUMN 10

Line 1, "(Fifth" should read --(Fifth specific--.
Line 18, "mJ/puls.cm$^2$" should read --mJ/puls•cm$^2$--.
Line 60, "heated, so that they" should read --heated so that it--.

COLUMN 11

Line 34, "mJ/puls.cm$^2$" should read --mJ/puls•cm$^2$--.
Line 66, "heat -radiating" should read --heat-radiating--.

COLUMN 15

Line 14, "manufacturing" (first occurrence) should read --being manufactured by--.

Signed and Sealed this

Eleventh Day of May, 1999

Q. TODD DICKINSON

*Attest:*

*Attesting Officer*        Acting Commissioner of Patents and Trademarks